United States Patent [19]

Ledermann et al.

[11] Patent Number: 5,655,468
[45] Date of Patent: Aug. 12, 1997

[54] DELIVERY SYSTEM FOR AN AGRICULTURAL IMPLEMENT

[75] Inventors: Donald L. Ledermann, Darien; John F. Stufflebeam, Romeoville, both of Ill.

[73] Assignee: Case Corporation, Racine, Wis.

[21] Appl. No.: 447,065

[22] Filed: May 17, 1995

[51] Int. Cl.⁶ .................................................. A01C 15/04
[52] U.S. Cl. .......................... 111/164; 111/174; 111/179; 222/637; 221/211; 285/8; 285/252; 285/260; 285/148.22; 285/148.23
[58] Field of Search ........................ 111/174, 175, 111/176, 179, 185, 164; 222/522, 630, 195, 637; 221/211; 285/253, 260, 176, 177, 8

[56] References Cited

U.S. PATENT DOCUMENTS

| | | | |
|---|---|---|---|
| 591,468 | 10/1897 | Gold | 285/253 X |
| 1,180,733 | 4/1916 | Mulherw | 285/176 X |
| 2,726,682 | 12/1955 | Conroy et al. | 285/253 X |
| 2,923,574 | 2/1960 | Fuss et al. | 111/174 X |
| 3,039,655 | 6/1962 | Pfeuffer | 222/133 |
| 3,387,746 | 6/1968 | Whipple | 111/174 X |
| 3,412,908 | 11/1968 | Ferrault | 222/194 |
| 3,415,450 | 12/1968 | Hawk, Sr. | 239/85 |
| 3,596,805 | 8/1971 | Farmery | 111/174 X |
| 3,637,108 | 1/1972 | Loech et al. | 221/211 |
| 3,762,603 | 10/1973 | Bauman et al. | 221/211 |
| 3,860,146 | 1/1975 | Bauman et al. | 221/111 |
| 3,964,639 | 6/1976 | Norris | 111/176 X |
| 4,076,285 | 2/1978 | Martinez | 285/423 X |
| 4,110,144 | 8/1978 | Buehler et al. | 285/423 X |
| 4,181,241 | 1/1980 | Currah | 111/174 X |
| 4,514,244 | 4/1985 | Shaefer et al. | 285/177 X |
| 4,569,486 | 2/1986 | Balmer | 239/655 |
| 4,629,218 | 12/1986 | DuBois | 285/177 X |
| 4,703,956 | 11/1987 | Keech | 285/177 X |
| 4,744,695 | 5/1988 | Lindsey et al. | 285/176 X |
| 4,793,742 | 12/1988 | Strand | 406/79 |
| 4,886,208 | 12/1989 | Strand | 239/77 |
| 4,919,127 | 4/1990 | Pell | 285/177 X |
| 4,958,857 | 9/1990 | Sixsmith | 285/253 X |
| 5,160,811 | 11/1992 | Ritzmann | 285/176 X |
| 5,161,473 | 11/1992 | Landphair et al. | 111/176 |
| 5,338,070 | 8/1994 | Horikawa et al. | 285/177 |
| 5,379,706 | 1/1995 | Gage et al. | 111/174 X |
| 5,392,722 | 2/1995 | Snipes et al. | 111/174 |

FOREIGN PATENT DOCUMENTS

| | | | |
|---|---|---|---|
| 1129256 | 8/1982 | Canada | 111/174 |
| 816609 | 10/1951 | Germany | 111/176 |
| 2719069 | 11/1977 | Germany | 111/174 |
| 3246733 | 6/1984 | Germany | 111/174 |
| 917746 | 4/1982 | U.S.S.R. | 111/174 |
| 1026684 | 7/1983 | U.S.S.R. | 111/174 |

Primary Examiner—Terry Lee Melius
Assistant Examiner—Christopher J. Novosad
Attorney, Agent, or Firm—Rudnick & Wolfe

[57] ABSTRACT

A system is provided for delivering particulate material from a material storage hopper to a remote discharge station on a wheeled frame structure of an agricultural implement. The system includes a material dispensing mechanism, a connector, and an elongated material conveying tube. The dispensing mechanism is adapted to receive material from the hopper and dispense the material through an outlet conduit. The outlet conduit is directed at an angle relative to the discharge station. The conveying tube delivers material from the dispensing mechanism to the discharge station. The connector interconnects the outlet conduit to one end of the tube and has a passageway therethrough to allow material to pass from the outlet conduit to the tube. The connector is configured to direct the axis of the tube generally closer to the discharge station relative to the axis of the outlet conduit. Thus, material is propelled through the outlet conduit at an angle relative to the discharge station, changes direction toward the discharge station, and flows through the tube to said discharge station.

25 Claims, 5 Drawing Sheets

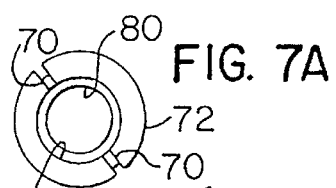
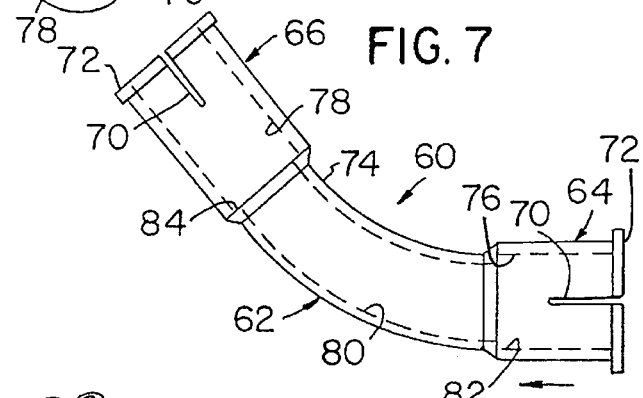
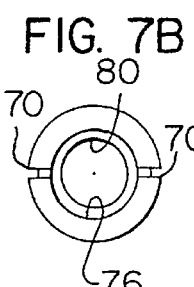
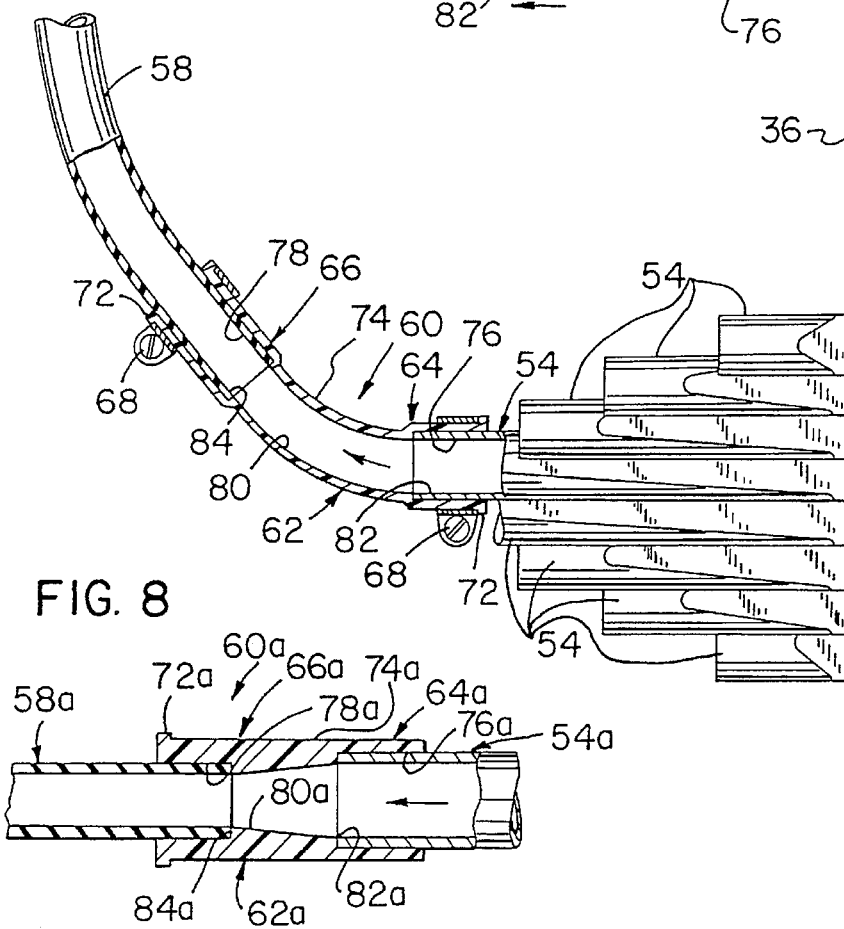
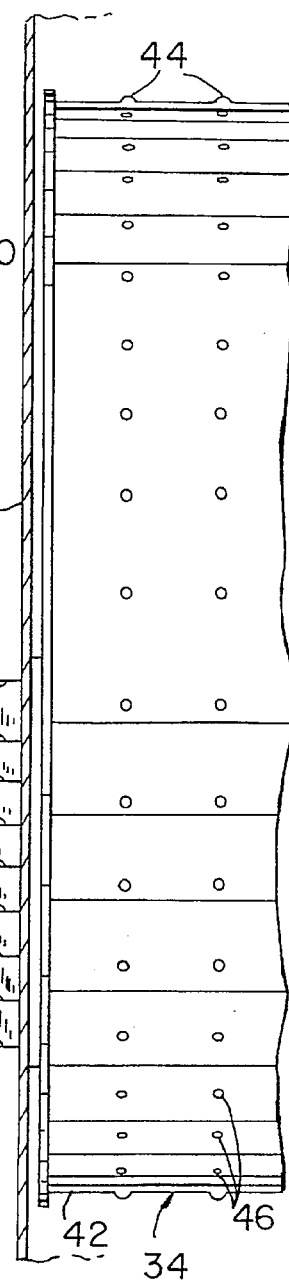

DELIVERY SYSTEM FOR AN AGRICULTURAL IMPLEMENT

FIELD OF THE INVENTION

The present invention relates generally to agricultural implements and, more particularly, to a pneumatic seed delivery system for a mobile planter or the like.

BACKGROUND OF THE INVENTION

Agricultural implements such as planters and fertilizers are commonly known in the agricultural industry. Such implements typically include a material hopper and a material dispensing mechanism installed on a wheeled frame structure. The dispensing mechanism includes a manifold that dispenses materials through a plurality of outlet conduits. Typically, the outlet conduits are arranged in side-by-side relation to each other and in combination extend in a generally fore-and-aft direction relative to the frame.

To reduce the number of passes a farmer must make across a field and to increase implement efficiency, a plurality of discharge stations are provided on the frame at transverse remote locations relative to the material dispensing mechanism. To effect delivery of material between the hopper and each discharge station, a series of conveying tubes of different elongated lengths are connected to the outlet conduits of the material dispensing mechanism. Each conveying tube extends to an individual discharge station where the material is deposited to the ground as the frame structure travels across a field. A material distribution system of this general type is shown and described in U.S. Pat. No. 3,860,146, issued Jan. 14, 1975, and U.S. Pat. No. 3,637,108, issued Jan. 25, 1972.

One difficulty with these types of material distribution systems is the delivery of the material from the outlet conduits of the dispensing mechanism to the discharge stations. As known, the conveying tubes are specifically sized to extend from the outlet conduit to a corresponding discharge station. In some distribution systems, some of the conveying tubes can measure as long as 16 feet in length or even longer.

Because the discharge stations are generally located transversely to the dispensing mechanism, the conveying tubes may make several twists and bends up to 90° along their lengths to reach the discharge stations. Accordingly, a manual intensive effort is involved to properly develop a conveying tube leading to those discharge stations located on the frame transversely from the material dispensing mechanism. As is known, this bending of the tubes causes added stress to the tubes as the frame structure travels across the field, which can lead to breakage and require replacement of one or more entire tubes.

The configuration of these tubes for connection to the outlet conduits can cause additional reliability and maintenance problems. For example, a swedging process has been utilized to configure the ends of the tubes for telescopically receiving the outlet conduits. Because the tubes are specifically sized, mistakes or other human errors occurring during the swedging process can result in a defective tube that must be scrapped or used for another purpose. Depending in part on the experience of the person making the swedged tube, and primarily because swedging is a manual process, consistency between the swedged tube ends is sometimes a problem. As will be appreciated, such wasteful use of tubing can quickly lead to unnecessary and undesirable increases in operational costs of the implement.

Moreover, even when successfully accomplished, the swedging process tends to harden the end portion of the tube thus making it more susceptible to damage and breakage. Whether because of the bending or the hardening of the material, if the tube breaks or fails, normally the entire tube has to be replaced by a new "swedged-end" tube, which is both costly and time consuming.

In order to avoid the problems associated with swedging the tubes, some material distribution systems simply provide oversized tubes with the ends clamped to the outside of the outlet conduits. However, these types of connections tend to create obstructions in the flow of material between the outlet conduits and the tubes, thus decreasing the accuracy of material flow to the discharge stations.

As will be appreciated by those skilled in the art, decreasing the accuracy of material flow through the tubes results in planting problems and attendant drawbacks associated therewith. In addition, a larger diameter tube decreases the material flow rate in the tube.

Thus, it remains desirable to provide a connector which has a smooth transition for facilitating material flow and also directs the flow of material from an outlet conduit toward a discharge station.

SUMMARY OF THE INVENTION

In view of the above, and in accordance with one aspect of the present invention, there is provided a system for delivering particulate material from a material storage hopper to a remote discharge station on a wheeled frame structure of an agricultural implement. The delivery system includes a material dispensing mechanism, a connector, and an elongated material conveying tube. The dispensing mechanism is adapted to receive material from the hopper and dispense the material through an outlet conduit. The outlet conduit is directed at an angle relative to the discharge station. The conveying tube delivers material from the dispensing mechanism to the discharge station. The connector interconnects the outlet conduit to one end of the conveying tube and has a passageway therethrough to allow material to pass from the outlet conduit to the tube. The connector is configured to begin directing the tube generally closer to the discharge station relative to the axis of the outlet conduit. Thus, material is propelled through the outlet conduit at an angle relative to the discharge station, changes direction toward the discharge station, and flows through the tube to said discharge station.

Another aspect of the invention is to provide a connector which allows unobstructed passage of material from the outlet conduit to the tube. The connector has a body and opposing end portions. The end portions have an inner diameter which is larger than the inner diameter of the body for telescopically receiving the respective outlet conduit and tube. Thus, the inner diameters of the outlet conduit, connector body, and tube are substantially the same to provide a generally continuous, uniform conduit through which the material can flow unobstructed.

In one form of the invention, the connector is tubular and bends at least 45° in a curvilinear fashion. The connector is made of a semi-rigid elastomeric material and preferably has a radius of curvature of about 5 inches. In addition, a pair of clamping devices operably engage the end portions of the connector to releasably secure the outlet conduit and tube. Each end portion has a longitudinal slot formed therein to allow the end portions of the connector to contract when clamped by the clamping devices.

The present invention provides significant advantages over other material delivery systems utilizing a central dispensing mechanism and a remote discharge station. The connector obviates the need to swedge or otherwise custom fit the end of the elongated tube for connection to the outlet conduit of the dispensing mechanism, thus reducing replacement costs and facilitating assembly and maintenance in the field. In addition, the connector directs the conveying tube toward the discharge station to reduce the amount the tube has to bend in order to reach the station, thus minimizing stress on the tube and enhancing material delivery. The enlarged inner diameters of the connector end portions relative to the body portion also allow quick-connection while providing a generally continuous, uniform conduit through which the material can flow unobstructed. Thus, the spacing of the seeds delivered to the discharge station tends to be more accurate.

The present invention, together with further features and advantages, will be best understood by reference to the following detailed description taken in conjunction with the accompanying drawings and claims.

BRIEF DESCRIPTION OF THE DRAWINGS

FIG. 2A is a left side view of a manifold viewed along the line 2A—2A in FIG. 2;

FIG. 2B is a front view of an outlet conduit of the manifold viewed along the line 2B—2B in FIG. 2A;

FIG. 6 is an enlarged fragmentary top plan view of the seed dispensing mechanism showing a plurality of outlet conduits and a connector interconnecting one of the outlet conduits to a conveying tube;

FIG. 7 is a top plan view of the connector shown in FIG. 6;

FIG. 7A is an end view of the connector shown in FIG. 7;

FIG. 7B is an opposite end view of the connector shown in FIG. 7; and

FIG. 8 is a top plan view of an alternative embodiment of the connector shown partially in cross-section.

DETAILED DESCRIPTION OF THE PREFERRED EMBODIMENTS

Figure 1:
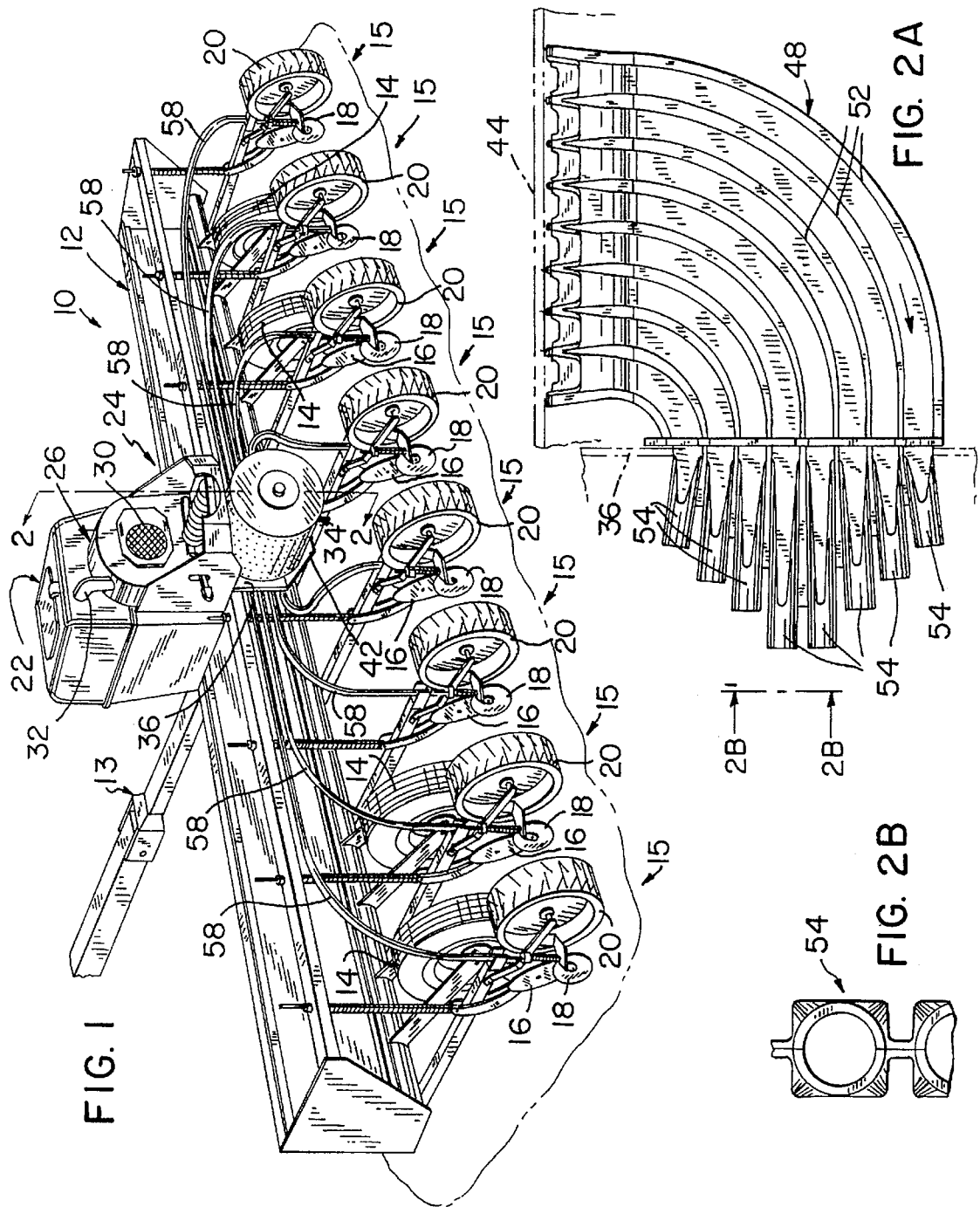
FIG. 1 is a rear perspective view of a seed distribution system constructed in accordance with the principles of the present invention and showing a seed dispensing mechanism installed toward a central location on a mobile agricultural planter, and a plurality of conveying tubes leading to several remote discharge stations.

While the present invention is susceptible of embodiment in various forms, there are shown in the drawings and will hereinafter be described preferred embodiments of the invention with the understanding that the present disclosure is to be considered as setting forth an exemplification of the invention which are not intended to limit the invention to the specific embodiments illustrated.

Referring now to the drawings, wherein like reference numerals refer to like parts throughout the several views, there is shown in FIG. 1 an agricultural implement 10 such as a planter or the like which distributes particulate material, such as seeds, onto the ground. The planter 10 includes a transversely elongated frame structure 12 which is supported by wheels 14. The frame structure 12 is coupled to a hitch assembly 13 and pulled by a suitable off-highway tractor (not shown) across a field. The planter 10 further includes a plurality of discharge stations 15, preferably eight separate stations, at transversely spaced apart locations on the frame structure 12. At each discharge station 15, the usual discs 16 are provided for producing furrows in the ground and into which seeds are individually dropped, and trailing furrow-closing discs 18 occupy positions rearwardly of the discs 16. Press wheels 20 trail the discs 18 in the usual manner of planter operation.

In the illustrated embodiment, the planter also includes a hopper 22 for the storage of seeds to be planted and a pneumatic seed dispensing mechanism 24 which receives seeds from the hopper 22. The hopper 22 and the seed dispensing mechanism 24 are preferably mounted near a central section of the frame structure 12. In the illustrated embodiment, a conventional blower assembly 26 including a fan 28 and a screened inlet opening 30 is arranged in combination with hopper 22. Air is delivered to the hopper 22 through an elbow conduit 32 to create an air pressure differential within the hopper which enhances the flow of seeds from the hopper to a rotary cylindrical seed distribution drum 34. A transverse plate 36 extends downwardly from the blower assembly 26 for rotatably supporting the drum 34.

Figure 2:
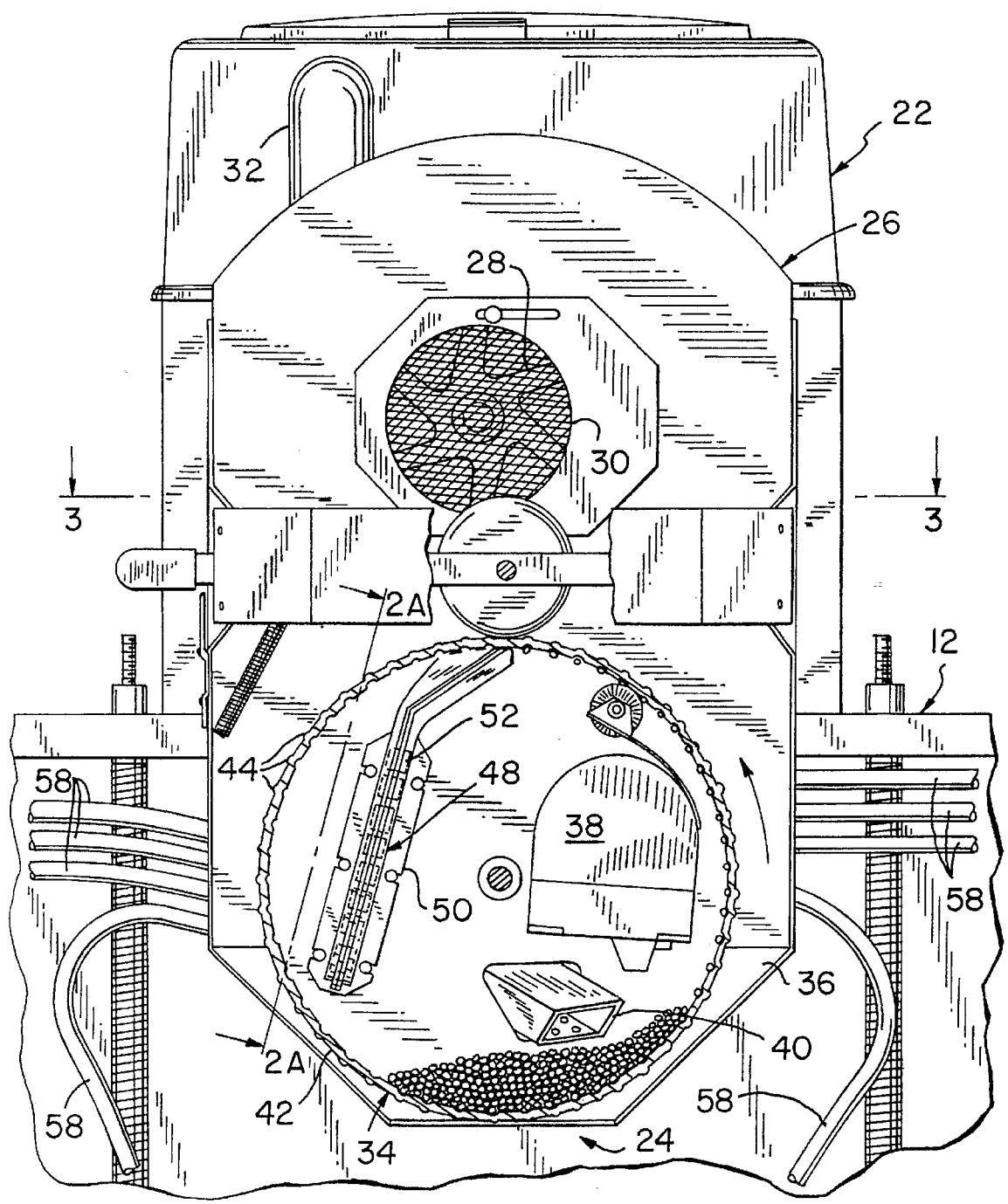
FIG. 2 is an enlarged fragmentary rear sectional view of the seed distribution system showing a drum of the dispensing mechanism in section.

As best shown in FIG. 2, the blower 26 also supplies air to the interior of the drum 34 via a hood-like baffle 38 to continuously maintain both the hopper 22 and the drum 34 pressurized. To allow seed to flow downwardly from the hopper 22 and into the interior of the drum 34, an inclined seed delivery chute 40 extends from the hopper 22 into the drum 34. The drum 34 includes a cylindrical shell or wall 42 which is formed with a plurality of circular rows or depressions 44. Each depression 44 has an opening 46 formed therein for retaining individual seeds under pressure as the drum 34 rotates.

Figure 3:
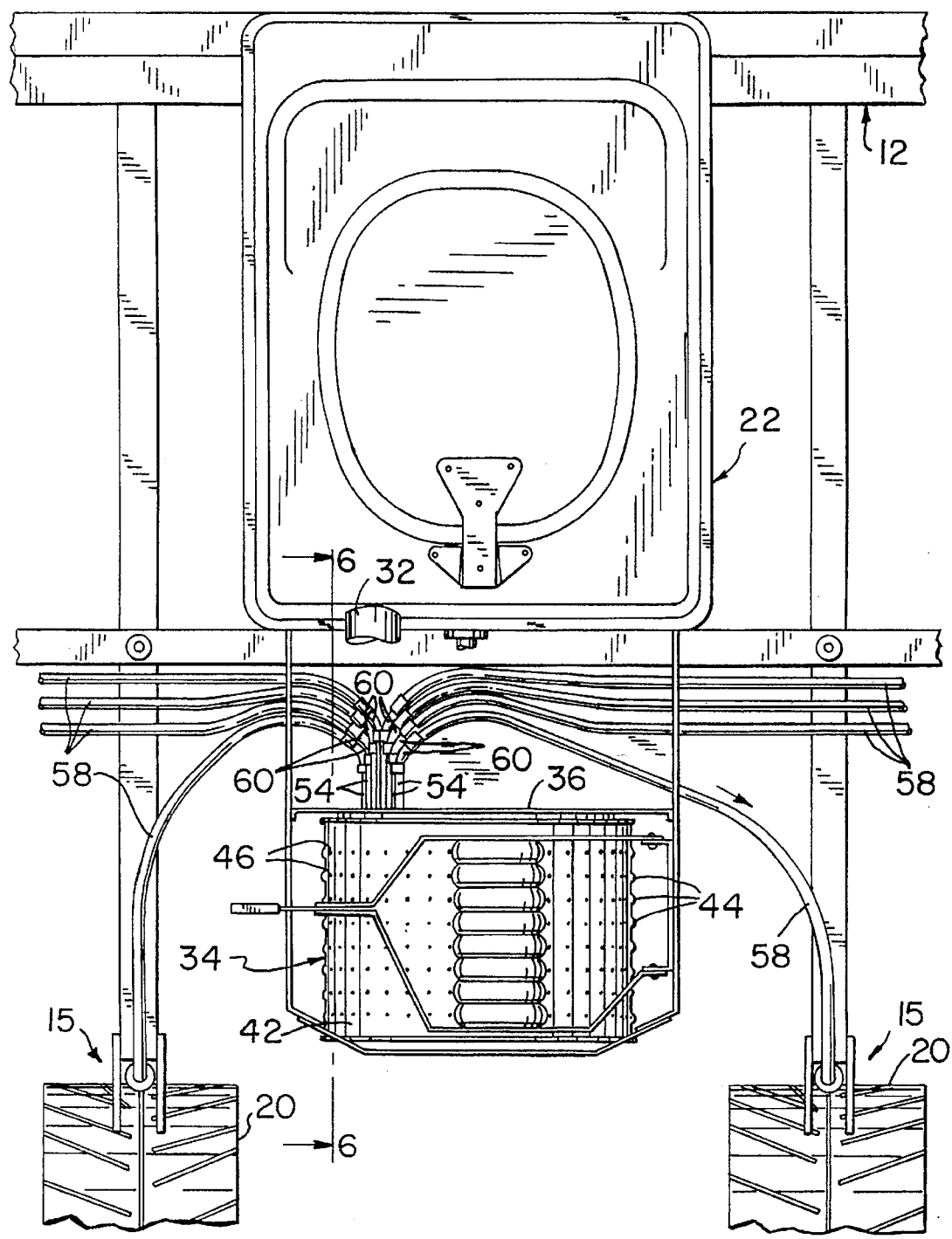
FIG. 3 is an enlarged fragmentary top plan view of the seed distribution system with various components removed for clarity.
Figures 4, 5:
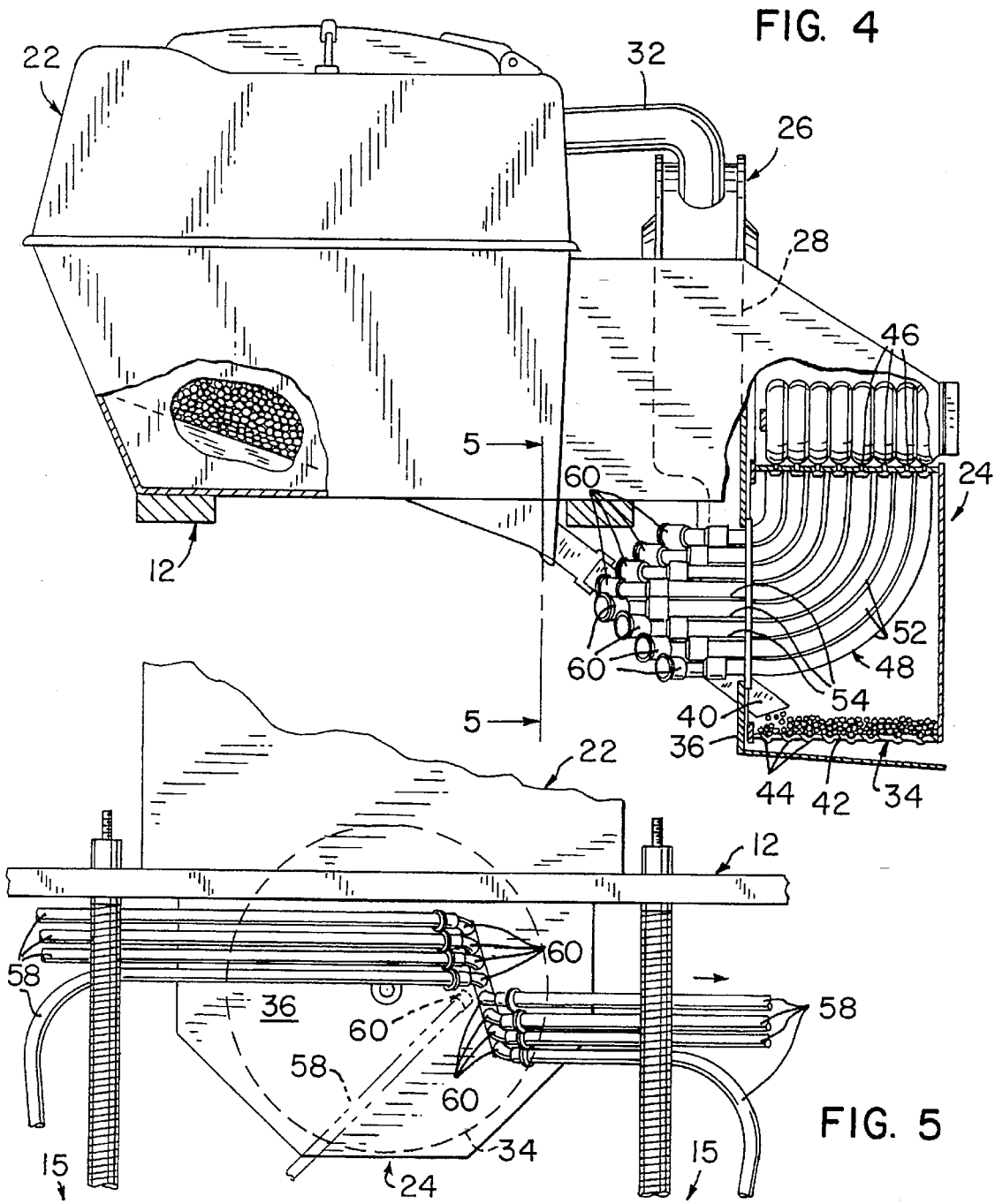
FIG. 4 is a left side elevational view of the seed dispensing mechanism shown with the conveying tubes removed for clarity.
FIG. 5 is an enlarged fragmentary front view of the seed distribution system showing one of the connectors rotated downwardly in broken lines.

To deliver the seeds from the hopper 22, a seed manifold 48 having a flange 50 is secured to the plate 36. As known, and as shown in FIGS. 3 and 4, the seed manifold 48 includes a plurality of manifold branches 52 each having an open top aligned with the circular rows of openings 46. The manifold branches 52 extend through the plate 36, and individual outlet conduits 54 are connected thereto. As best shown in FIGS. 3, 4 and 6, the outlet conduits 54 are configured as tubes having different lengths to facilitate connection of conveying tubes thereto. The outlet conduits 54 extend in a fore-and-aft direction relative to the frame 12 and are open at their distal ends. In addition, the outlet conduits 54 are generally aligned to define a plane oriented at an angle from a vertical plane. Thus, because the discharge stations 15 are transversely spaced along the width of the frame 10, the fore-and-aft outlet conduits 54 extend generally perpendicular to the direction the material must travel to reach the discharge stations 15.

In operation, individual seeds from the seed mass deposited in drum 34 are held against the openings 46 within the depressions 44 as a result of the flow of air from within the drum 34 outwardly through openings 46. The drum 34 is drivingly rotated and carries the captured seeds with it toward the open tops of the manifold branches 52 where a series of external rollers 56 pass over the depressions 44. As the drum 34 moves therepast, the rollers 56 close off the openings 46 to equalize the air pressure so that the seeds are no longer constrained to cling to the drum wall. At this time, the seeds are disposed directly above the manifold branches 52 so that the seeds fall by gravity into respective manifold branches.

Individual seeds are propelled through the manifold branches 52 and their respective outlet conduits 54 at a carefully metered flow rate. The seeds are then pneumatically delivered through elongated conveying tubes 58 to the discharge stations 15 where they are deposited on the ground. The general direction of seed flow is indicated by the arrows throughout FIGS. 1–8. It should be noted that the conveying tubes 58 can comprise separate sections joined by a split manifold or other coupling device for ultimately delivering the seeds to the discharge stations 15.

The above-described method of seed distribution is well known in the art and is described in more detail in U.S. Pat. No. 3,860,146, the disclosure of which is specifically incorporated herein by reference. While this particular distribution system is described and illustrated for purposes of disclosure, it is contemplated that other distribution systems having different constructions may be utilized within the scope of the invention described below. For example, although the illustrated embodiment shows the outlet conduits 54 extending forwardly from the seed dispensing mechanism 24, the dispensing mechanism 24 could be arranged on the frame 12 so that the outlet conduits 54 extend rearwardly therefrom.

In accordance with the present invention and as shown in FIG. 5, a plurality of tubular connectors 60 interconnect the outlet conduits 54 and their respective conveying tubes 58. The structure of the connectors 60 are substantially identical and will be described particularly only with reference to the connector shown in FIGS. 6 and 7.

As shown in FIGS. 6 and 7, the connector 60 has a body portion 62 and opposing end portions 64 and 66. In the embodiment shown in FIGS. 6 and 7, the body portion 62 of connector 60 preferably bends about 40° in a curvilinear fashion in order to direct its associated conveying tube 58, and consequently the flow of seeds, toward a desired discharge station 15.

In one embodiment, the radius of curvature of the body portion 62 is about 5 inches. The connector 60 can be configured with a bend of any desired angle, although the best results may be obtained when the bend ranges between 0° (i.e. linear) and 90° from the axis of the connector. Preferably, the connector 60 is made of a semi-rigid, elastomeric material such as polyethylene in order to maintain its curvature. In a most preferred form of the invention, connector 60 is formed in a molding process. It will be appreciated, however, that other methods can be utilized to fabricate the connector without departing or detracting from the spirit and scope of the present invention.

The curved connector 60 reduces and in some instances eliminates the bend radius of the flexible tube 58 as compared to a direct connection of the tube 58 to the outlet conduit 54. This allows the highest area of stress to be located in the connector 60 rather than the tube so that the connector 60 is more likely to fail than the tube 58. As will be appreciated, it is easier and less costly to manufacture and replace a connector 60 than an entire conveyor tube 58.

In order to releasably secure the connector 60 to the outlet conduit 54 and conveying tube 58, the end portions 64 and 66 telescopically receive respective end portions of the outlet conduit 54 and the conveying tube 58. A pair of clamping devices 68 such as conventional hose clamps are then tightened around the end portions 64 and 66. Preferably, the end portions 64 and 66 each have a longitudinal slot 70 formed therein to allow the end portions 64, 66 of the connector 60 to contract when clamped by the clamping devices 68. In addition, an annular seat 72 is preferably formed at the terminal ends of the connector 60 for locating or seating the clamping devices 68.

To provide an unobstructed pathway for the seeds, the end portions 64 and 66 have inner diameters 76 and 78, respectively, which are larger than an inner diameter 80 of the body portion 62. Preferably, an annular step or shoulder 82 is defined between the inner diameter 76 of end portion 64 and the inner diameter 80 of the body portion 82. Similarly, an annular step or shoulder 84 is defined between the inner diameter 78 of end portion 66 and the inner diameter 80 of the body portion 82. The outlet conduit 54 and conveying tube 58 fit within the respective end portions 64 and 66 to provide a generally continuous, unobstructed conduit between the outlet conduit 54, connector body portion 62, and conveying tube 58. Preferably, the ends of the outlet conduit 54 and tube 58 bear against the shoulders or steps 82 and 84, respectively, inside the connector 60.

In those situations where the inner diameters of the outlet conduit 54 and conveying tube 58 are substantially the same, the inner diameter 80 of the connector body portion 62 may be substantially constant to provide a continuous conduit having a uniform cross-section along its length. However, the dimensions of the connector 60 can vary to accommodate different size outlet conduits and conveying tubes. In the embodiment shown in FIGS. 6 and 7, the inner diameter 76 of the end portion 64 is greater than the inner diameter 78 of the end portion 66 to accommodate an outlet conduit 54 which is larger than the conveying tube 58. As a result, the inner diameter 80 of the body portion 62 decreases over its length in a funnel-like fashion from the larger diameter end portion 64 to the smaller diameter end portion 66.

In the example illustrated, the inner diameter 80 of the body portion 62 is about 0.850 inches near the outlet conduit end portion 64, and about 0.830 inches near the conveying tube end portion 66. Also in the example illustrated, the inner diameter 76 of the end portion 64 is about 1.062 inches, and the inner diameter 78 of the end portion 66 is about 1.031 inches. In addition, a wall 74 of the connector 60 is about 0.125 inches thick. As will be appreciated, forming the connector 60 in a molding process allows precise dimensions to be consistently maintained for the connector 60. Also, the molding process reduces the time and cost required to make large and consistently shaped quantities of connectors.

The above-described configuration for the connector 60 provides a smooth transition from the outlet conduit 54 to the conveying tube 58 so that the seeds can flow unobstructed. More particularly, this configuration minimizes edges or corners that obstruct free passage of the particulate material therepast. As is well known, when edges or corners are prominent along the path of material delivery, erratic seed flow usually results, thus hindering performance of the implement and possibly causing subsequent seed germination problems, plant growth problems, and harvesting problems.

In the past, and as mentioned above, in order to fit the ends of the conveying tubes 58 over the respective outlet conduits 54 of the manifold 48, the end portions of the elongated conveyor tube 58 have been formed by a swedging process. In that process, the end portion of each conveying tube 58 is immersed in a heated liquid (i.e., antifreeze) to soften and make pliable the material at the end of the tube. The pliable end portion of the tube is then placed over a mandrel to swedge the end into the desired configuration suitable to fit over the outlet conduit 54 on the manifold 48. As mentioned above, because the conveyor tubes 58 are specifically sized, mistakes or other human errors occurring during the swedging process can result in a defective tube that must be scrapped or used for another purpose.

As will be appreciated by those skilled in the art, errors in fabrication of the conveyor tubes 58 during the swedging process, although costly, are not as imposing as when the conveyor tube 58 breaks, kinks or otherwise fails as the implement 10 is being pulled across a field in a location miles away from a supplier or a maintenance repair area. Of course, if one or more of the conveyor tubes 58 breaks or otherwise fails, that discharge station 15 to which the broken conveyor tube 58 leads is inoperative in that seeds can no longer be transported thereto. Depending upon where it breaks or fails, and although the conveyor tube 58 may be long enough such that the failed portion of the tube could severed or removed, during a field planting operation, the operator does not normally have the necessary equipment to effect a swedging operation on the severed end of the tube and, thus, the tube is cannot be suitably configured to fit over the end of the outlet conduit 54.

Accordingly, the operator needs to disconnect the broken or failed conveyor tube 58 from the implement 10, and return to an area where a new length of tubing can be sized and subsequently swedged such that the free end fits over the outlet conduit 54 of the manifold 48. Alternatively, the operator needs to travel to a dealership to purchase a new conveyor tube for this particular planter arrangement. In the interim, however, the planter implement 10 is inoperative thus effecting the efficiency and effectiveness of the planter. The fact that time is of the essence during a planting operation only further exacerbates the problem.

The present invention overcomes these difficulties by using a connector 60 which is considerably easier to repair or replace than the entire length of conveyor tube 58. The connector 60 facilitates maintenance, repair, and substantially reduces replacement costs because it obviates the need to swedge or otherwise custom fit the end of a conveyor tube 58. Instead of having to fabricate or go to a dealer to get a swedged end tube, the connector 60 provides a quick connection that allows regular tubes with unswedged ends to be quickly and easily connected to the manifold 54 whether the implement is undergoing preventative maintenance or a conveyor tube breaks or otherwise fails in the field during the midst of a planting operation. Because the connector 60 is preformed, it saves manufacturing time, manufacturing costs, plus dealer time and costs.

FIG. 8 illustrates an alternative embodiment of the connector 60, indicated generally at 60a. Since embodiment 60a has portions similar to the previously described embodiment 60, similar parts appearing in FIG. 8 are represented by the same, corresponding reference numeral, except for the suffix "a" in the numerals of the latter.

As shown in FIG. 8, the connector 60a is straight and has a uniform outer diameter along its length. It will be appreciated that a relatively straight connector may be desirable if one of the discharge stations 15 is located immediately adjacent the dispensing mechanism 24 or is otherwise positioned along the fore-and-aft direction of the outlet conduits 54. In addition, the internal dimensioning of the connector shown in FIG. 8 could be incorporated in a curved connector of the type shown in FIGS. 6 and 7.

Referring now to FIGS. 3–5, the four upper connectors 60 bend toward the discharge stations 15 located on one side of the frame structure 12, and the four lower connectors 60 bend toward the discharge stations 15 located on the other side of the frame structure 12. One particular advantage of the connectors 60 is their ability to rotate about the axis of the outlet conduits 54 in order to direct the corresponding conveying tube 58 in a desired vertical direction. This feature may be especially desirable to accommodate a particular length tube in relation to its discharge station 15. For example, a shorter tube may be utilized by rotating the connector downwardly as shown in broken lines in FIG. 5. Similarly, a connector may be rotated in order to take up the slack of an extra long tube.

Thus, a delivery system is provided which enhances metered seed flow, facilitates repair and maintenance, and reduces overall costs of operating an agricultural implement such as a planter.

From the foregoing, it will be observed that numerous modifications and variations can be effected without departing from the true spirit and scope of the novel concept of the present invention. It will be appreciated that the present disclosure is intended to set forth exemplifications of the invention, which exemplifications are not intended to limit the invention to the specific embodiments illustrated. The disclosure is intended to cover by the appended claims all such modifications as fall within the scope of the claims.

What is claimed is:

1. A system for delivering particulate material from a material storage hopper to a remote discharge station on a wheeled frame structure of an agricultural implement, said delivery system comprising:

a material dispensing mechanism adapted to receive material from said hopper and dispense said material through an outlet conduit directed at an angle relative to the discharge station;

an elongated material conveying tube extending substantially the entire distance between the outlet conduit and the discharge station for delivering material from said dispensing mechanism to said discharge station, said conveying tube having a material flow entry end adjacent the dispensing mechanism and a material flow exit end adjacent the discharge station; and a connector interconnecting the outlet conduit to said material flow entry end of the tube and having a passageway therethrough to allow material to pass from said outlet conduit to said tube, said connector configured with a bend in order to direct the axis of the tube generally closer to the discharge station relative to the axis of the outlet conduit, whereby material is propelled through the outlet conduit at an angle relative to the discharge station, changes direction toward the discharge station, and flows through the tube to said discharge station.

2. The system of claim 1 wherein the bend in the connector is at least 40 degrees.

3. The system of claim 1 wherein the connector bends in a curvilinear fashion.

4. The system of claim 1 wherein the connector is tubular.

5. The system of claim 4 wherein the connector has a body and opposing end portions, each end portion having an inner diameter which is larger than the inner diameter of the body for telescopically receiving the respective outlet conduit and tube, whereby the outlet conduit, connector body, and tube provide a generally continuous and unobstructed conduit through which the material can flow unobstructed.

6. The system of claim 5 wherein a shoulder is defined by the transitions between the inner diameter of the body and the inner diameters of each end portion, each shoulder acting as a stop for the respective tube and outlet conduit.

7. The system of claim 5 wherein the inner diameters of the end portions of said connector are of different size to define a larger diameter end portion and a smaller diameter end portion, and the inner diameter of the body decreases over its length from the larger diameter end portion to the smaller diameter end portion.

8. The system of claim 5 further comprising a pair of clamping devices operably engaging the end portions of the connector to releasably hold the outlet conduit and tube.

9. The system of claim 1 wherein the connector has a semi-rigid body with a fixed curvilinear configuration such that end regions of said connector are positioned at a fixed angle relative to each other.

10. A system for delivering particulate material from a material storage hopper to a remote discharge station on a wheeled frame structure of an agricultural implement, said delivery system comprising:

a material dispensing mechanism adapted to receive material from said hopper and dispense said material through an outlet conduit, said outlet conduit attached to and extending outwardly from said dispensing mechanism at an angle relative to the discharge station;

an elongated material conveying tube extending substantially the entire distance between the outlet conduit and the discharge station for delivering material from said dispensing mechanism to said discharge station, said conveying tube having a material flow entry end and a material flow exit end; and a tubular connector having a body and opposing end portions for interconnecting the outlet conduit to the material flow entry end of the tube, said end portions having inner diameters larger than the inner diameter of said body for telescopically receiving the outlet conduit and said tube, whereby the outlet conduit, connector body, and tube provide a generally continuous and unobstructed conduit through which the material flows.

11. The system of claim 10 wherein the connector bends in a curvilinear fashion in order to direct the axis of the tube generally closer to the discharge station relative to the axis of the outlet conduit.

12. The system of claim 10 wherein a shoulder is defined by the transitions between the inner diameter of the body and the inner diameters of each end portion, each shoulder acting as a stop for the respective tube and outlet conduit.

13. The system of claim 10 wherein the inner diameters of the end portions of said connector are of different size to define a larger diameter end portion and a smaller diameter end portion, and the inner diameter of the body decreases over its length from the larger diameter end portion to the smaller diameter end portion.

14. The system of claim 10 further comprising a pair of clamping devices operably engaging the end portions of the connector to releasably hold the outlet conduit and tube.

15. The system of claim 10 wherein the connector is made of a semi-rigid elastomeric material.

16. A system for delivering particulate material from a material storage hopper to a remote discharge station on a wheeled frame structure of an agricultural implement, said delivery system comprising:

a material dispensing mechanism adapted to receive material from said hopper and dispense said material through an outlet conduit, said outlet conduit attached to and extending outwardly from said dispensing mechanism at an angle relative to the discharge station;

an elongated material conveying tube extending substantially the entire distance between the outlet conduit and the discharge station for delivering material from said dispensing mechanism to said discharge station, said conveying tube having a material flow entry end adjacent the dispensing mechanism and a material flow exit end adjacent the discharge station; and a tubular connector having a body and opposing end portions for interconnecting the outlet conduit to the material flow entry end of the tube, said body bending in a curvilinear fashion to direct the axis of the tube generally closer to the discharge station relative to the axis of the outlet conduit, and said end portions having inner diameters larger than the inner diameter of said body for telescopically receiving the outlet conduit and said tube, whereby the outlet conduit, connector body, and tube provide a generally continuous conduit through which the material can flow unobstructed.

17. The system of claim 16 wherein the connector has at least a 40 degree bend.

18. The system of claim 16 further comprising a pair of clamping devices operably engaging the end portions of the connector to releasably hold the outlet conduit and tube.

19. The system of claim 18 wherein each end portion of the connector has a longitudinal slot formed therein to allow said end portions to contract when clamped by the clamping devices.

20. The system of claim 19 wherein each clamping device comprises an annular band and the ends of the connector have an annular seat formed thereon for locating said annular bands.

21. The system of claim 16 wherein the connector is made of a semi-rigid elastomeric material.

22. The system of claim 16 wherein the connector defines shoulders at the transitions between the inner diameter of the body and the inner diameters of the end portions, said shoulders acting as a stop for the respective tube and outlet conduit.

23. The system of claim 22 wherein the inner diameters of the end portions of said connector are of different size to define a larger diameter end portion and a smaller diameter end portion, and the inner diameter of the body decreases over its length from the larger diameter end portion to the smaller diameter end portion.

24. The system of claim 23 wherein the connector has uniform outer diameter.

25. The apparatus of claim 16 wherein the connector is formed by an injection molding process.

* * * * *